(12) United States Patent
Hipp

(10) Patent No.: US 12,380,273 B2
(45) Date of Patent: Aug. 5, 2025

(54) METHOD FOR PROVISION OF A TRIGGER TOKEN

(71) Applicant: Siemens Healthineers AG, Forchheim (DE)

(72) Inventor: Tobias Hipp, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 237 days.

(21) Appl. No.: 18/053,231

(22) Filed: Nov. 7, 2022

(65) Prior Publication Data

US 2023/0146785 A1 May 11, 2023

(30) Foreign Application Priority Data

Nov. 9, 2021 (DE) ...................... 10 2021 212 607.3

(51) Int. Cl.
*G06F 40/284* (2020.01)
*G06F 11/30* (2006.01)

(52) U.S. Cl.
CPC ........ *G06F 40/284* (2020.01); *G06F 11/3072* (2013.01); *G06F 2201/835* (2013.01)

(58) Field of Classification Search
CPC ........................... G06F 40/284; G06F 11/3072
See application file for complete search history.

(56) References Cited

U.S. PATENT DOCUMENTS

| | | | |
|---|---|---|---|
| 6,774,786 B1 | 8/2004 | Havekost et al. | |
| 10,289,509 B2 * | 5/2019 | Xu | G06F 11/2263 |
| 10,579,928 B2 | 3/2020 | Wang et al. | |
| 2013/0103353 A1 | 4/2013 | Kloppner | |
| 2014/0218191 A1 | 8/2014 | Hollender et al. | |
| 2016/0291576 A1 | 10/2016 | Nakamura | |
| 2019/0026174 A1 * | 1/2019 | Basavarajappa | G06F 11/0709 |
| 2019/0196938 A1 * | 6/2019 | Mathen | G06F 18/295 |
| 2019/0317144 A1 * | 10/2019 | Xu | H01J 35/025 |
| 2020/0349112 A1 * | 11/2020 | Apurva | G06F 16/16 |
| 2020/0364113 A1 * | 11/2020 | Tormasov | G06F 11/1466 |
| 2021/0191798 A1 * | 6/2021 | Zhang | G06F 11/3476 |
| 2022/0086529 A1 * | 3/2022 | Gowda | H04N 21/251 |

(Continued)

FOREIGN PATENT DOCUMENTS

| | | |
|---|---|---|
| DE | 10122953 A1 | 5/2002 |
| DE | 10154534 A1 | 6/2002 |

(Continued)

*Primary Examiner* — Shaun Roberts
(74) *Attorney, Agent, or Firm* — HARNESS, DICKEY & PIERCE, P.L.C.

(57) ABSTRACT

A trigger token correlates with a need for maintenance of a system. A computer-implemented method comprises: receiving a logfile of the system, wherein the logfile includes a plurality of event descriptions, and a subset of the plurality of event descriptions is assigned a time stamp; receiving a point in time of a technical defect of the system; extracting tokens from the subset of the event descriptions based on a token category, wherein each of the extracted tokens is contained as a character string in the subset of the plurality of event descriptions; determining the trigger token from the extracted tokens based on a correlation of time stamps assigned to the extracted tokens with the point in time of the technical defect of the system; and provisioning the trigger token.

18 Claims, 7 Drawing Sheets

(56) References Cited

U.S. PATENT DOCUMENTS

2022/0164645 A1\* 5/2022 Zaina .................... G06N 3/044
2022/0245482 A1\* 8/2022 Inamdar ................ G16H 40/40
2022/0283930 A1\* 9/2022 Figueredo de Santana ................
G06F 11/3688

FOREIGN PATENT DOCUMENTS

DE 102010026678 A1 1/2012
DE 102013001926 A1 8/2014
DE 112013007685 T5 10/2016
WO WO 2016081970 A1 6/2016

\* cited by examiner

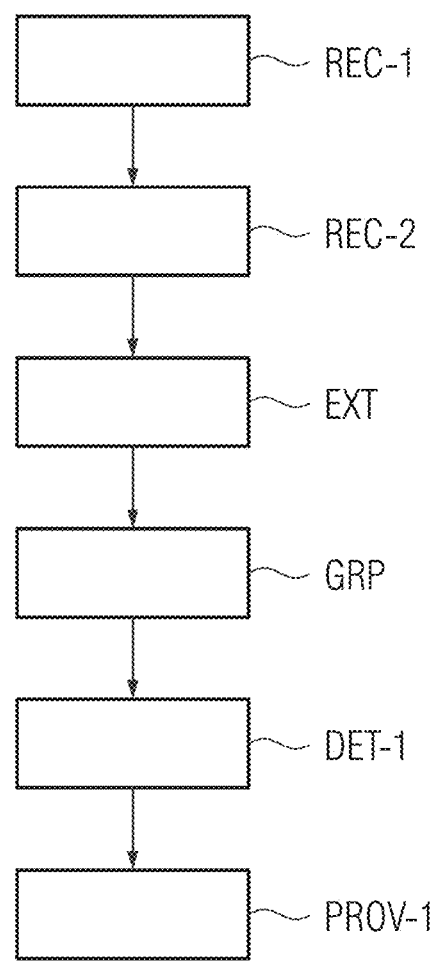

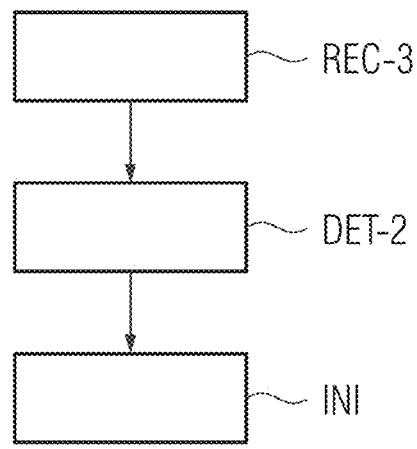
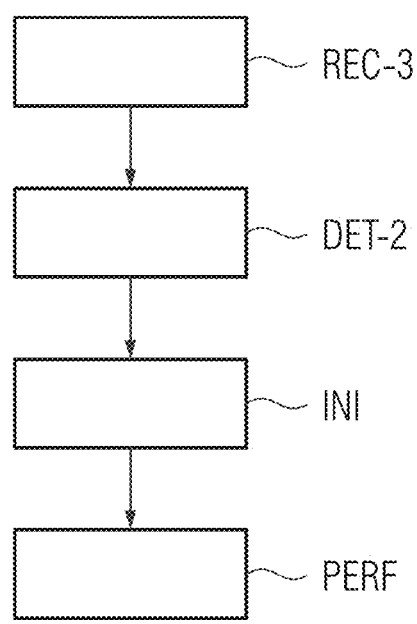

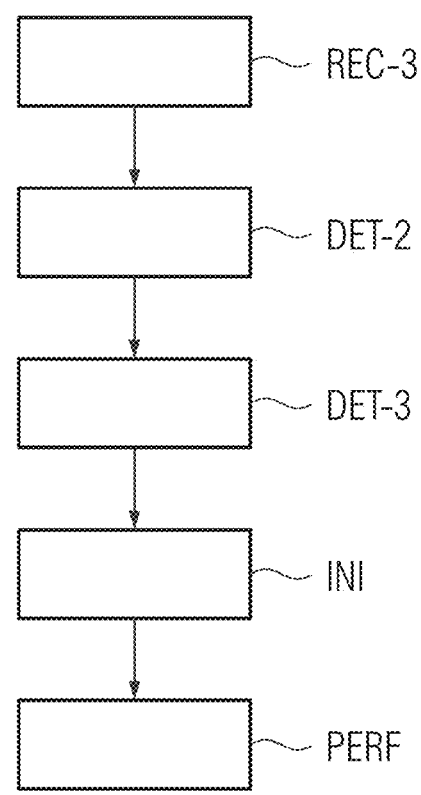

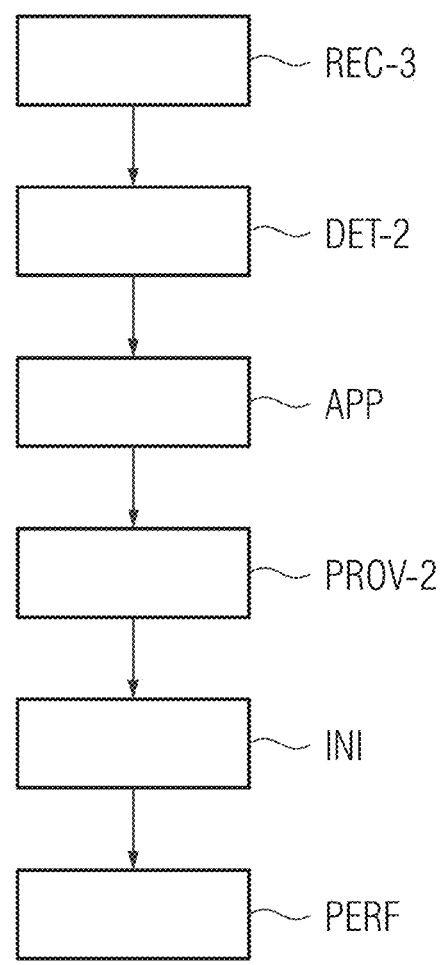

METHOD FOR PROVISION OF A TRIGGER
TOKEN

CROSS-REFERENCE TO RELATED APPLICATION(S)

The present application claims priority under 35 U.S.C. § 119 to German Patent Application No. DE 10 2021 212 607.3, filed Nov. 9, 2021, the entire contents of which are incorporated herein by reference.

FIELD

One or more embodiments of the present invention relate to a computer-implemented method for provision of a trigger token. One or more embodiments of the present invention further relate to a computer-implemented use of the trigger token provided for automated maintenance of a system, to a computer-implemented use of the trigger token provided for provision of a trained function, to a provision system that is embodied to carry out the method, to a medical apparatus, to a computer program product and/or to a computer-readable memory medium.

BACKGROUND

Today's computer-based systems typically create logfiles. Different events relating to the system are documented in such a logfile created by a system. For example, regular status messages from at least one component of the system are documented in the logfile. In this case the component is included in the system. In other words the component is a part of or an element of the system. As an alternative or in addition a use of the system can be documented in the logfile. In this case it can be documented that the system has been used, how or with which parameters it was used and/or whether there were striking features during the use. Typically each of these events is documented in the logfile in the form of an event description and of a time stamp assigned to the event description.

Because of the complexity of today's systems and their diversity of uses, very many such events are documented in the logfile. For this reason the logfile of a system is typically not very well structured. In particular the logfile is not well structured when it is not read or evaluated by the same program with which it has been created. What is more a very large volume of data is created in this way, which typically can no longer be handled manually or without the aid of a computer program.

Moreover the event descriptions in a logfile are very diverse and frequently not uniform between different systems or before and after an upgrade or update of the system.

It is known that, in particular based on an event description of a status message, a technical defect of the system can be predicted. The knowledge about an imminent or expected technical defect can be used to initiate and carry out maintenance of the system in order to avoid or delay the technical defect.

It is known that one or more event descriptions can be defined for this manually, which are monitored in the logfile. From the monitoring of these manually defined event descriptions an expected technical defect can be derived. However the manual effort is very great and because of the large volume of data and the diversity of the event descriptions, the most suitable or most informative event descriptions are frequently not defined for the monitoring. What is more all event descriptions that are suitable for a prediction of an expected technical defect are frequently not known. These are then typically not taken into account in a manual definition of the event descriptions to be monitored.

What is more the application of methods for Natural Language Processing, Acronym: NLP to the logfile is known in order to recognize and to monitor relevant event descriptions for a technical defect. In this case the event descriptions are broken down into words and the individual words are analyzed with respect to their number of incidences for example. It is however known that even a one-off or very low occurrence of a specific event description or of a word in an event description can predict a technical defect of the system. With this kind of rare occurrence of an informative event description it is frequently not possible via NLP methods to recognize the relevance of the corresponding event description for the prediction of a technical defect. This means that even via NLPs frequently not all relevant event descriptions are taken into account. Moreover, because of the diversity of the event descriptions typically a very large number of words are extracted from the event descriptions of the logfile via NLPs. This number is frequently so big that no meaningful analysis is possible any longer. In particular the processing effort for this method is very great. Thus, even via NLPs it is only possible to carry out a restricted analysis of the logfiles and not all relevant event descriptions are recognized and taken into account. What is more the logfiles typically do not comprise any sentences or sequences or words meaningful in the conventional sense. For this reason an analysis via NLPs is also only possible to a restricted extent, since NLP is typically embodied for recognition of words in context.

SUMMARY

An object of one or more embodiments of the present invention is therefore to provide a method that makes it possible to identify suitable information in a logfile of a system in order to predict a technical defect of the system.

At least this object is achieved by a computer-implemented method for provision of a trigger token. One or more embodiments of the present invention further relate to a computer-implemented use of the trigger token provided for automated maintenance of a system, to a computer-implemented use of the trigger token provided for provision of a trained function, to a provision system that is embodied to carry out the method, to a medical apparatus, to a computer program product and/or to a computer-readable memory medium as claimed in the independent claims. Advantageous developments are given in the dependent claims and in the description below.

An inventive way in which the object is achieved is described below both with regard to the apparatuses and also with regard to the methods according to one or more embodiments of the present invention. Features, advantages or alternate forms of embodiment mentioned here are likewise to be transferred to the other claimed subject matter and vice versa. In other words the physical claims (which are directed to an apparatus for example) can also be developed with the features that are described or claimed in conjunction with a method. The corresponding functional features of the method are embodied in such cases by corresponding physical modules.

Furthermore, an inventive way in which the object is achieved is described both with regard to methods and apparatuses for provision of a trigger token and also with regard to method and apparatuses for provision of a trained function. Here features and alternate forms of embodiment of data structures and/or functions for methods and apparatuses for determination of similar data structures and/or can be transferred to functions for method and apparatuses for adapting/optimizing/training. Furthermore the trained functions used in methods and apparatuses for provision of a trigger token can in particular have been trained or adapted and/or provided by methods for use of the trained function.

One or more embodiments of the present invention relate to a computer-implemented method for provision of a trigger token. In this case the trigger token correlates with a need for maintenance of a system. The method comprises a method step of receipt of a logfile of the system. In this case the logfile comprises a plurality of event descriptions. In this case a subset of the plurality of event descriptions is assigned a time stamp. The method furthermore comprises a method step of receipt of a technical defect of the system. The method furthermore comprises a method step of extraction of tokens from the subset of the event descriptions based on a token category. In this case each of the extracted tokens is contained as a character string in the subset of the event descriptions. The method furthermore comprises a method step of determination of the trigger token from the extracted tokens based on a correlation of the time stamps assigned to the extracted tokens with the time of the technical defect of the system, so that the time stamp assigned to the trigger token and the time of the technical defect of the system are positively correlated. The method furthermore comprises a method step of provision of the trigger token.

The system in this case can be a medical system, in particular a medical imaging system. For example the system can be a computed tomography (acronym: CT) system, a magnetic resonance tomography (acronym: MRT) system, an x-ray system, a mammography system, a C-arm system, an angiography system, an ultrasound system etc. As an alternative the system can be a laboratory diagnostic system for example.

The system can in particular comprise at least one component. The component can for example be an operating component or a movement component or positioning component of the system. For an x-ray system, a CT system, a mammography system, a C-arm system or an angiography system for example the component can be an x-ray tube or an x-ray detector. For an ultrasound system the component can for example be an ultrasound probe. For an MRT system the component can for example be a coil. When the expression "system" is used below, the expression "the component of the system" is encompassed by this.

In the method step of receipt of the logfile the logfile can in particular be received directly from the system or from a database. The database can be held in this case on a local server or a cloud server. As an alternative the logfile can be received from a memory medium. In other words, in the method step of receipt of the logfile, the logfile can be loaded from the memory medium.

The logfile can be character-coded.

The event descriptions comprised by the logfile each describe at least one event that relates to the system. In particular the event has taken place at the system or was carried out by the system. The event descriptions describe for example a status message of the system and/or a use of the system. In this case the use can be described for example by a parameter of the system in its use or by a state of the system in its use and/or by a result of the use.

The subset of the plurality of event descriptions can in particular comprise at least one event description. Advantageously the subset comprises at least two event descriptions. In particular the subset of the plurality of event descriptions can comprise all event descriptions of the plurality of event descriptions. As an alternative the subset of the plurality of event descriptions can comprise any given number of event descriptions of the plurality of event descriptions.

Each event description of the subset is assigned a time stamp. In this case the time stamps assigned to the different event descriptions of the subset can be different or the same.

A time stamp assigned to an event description is also referred to below as the time stamp of the event description.

The time stamp of an event description specifies when the corresponding event description was recorded in the logfile. As an alternative the time stamp specifies when the event of the system triggering the event description has taken place. The time stamp in this case comprises a date and a time of day. In particular the time stamp can be in a standardized format. The time stamps of the subset of event descriptions are likewise comprised by the logfile. For the subset of event descriptions the logfile thus comprises a pair consisting of event description and assigned or corresponding time stamp in each case.

In the method step of receipt of the point in time of the technical defect of the system the point in time is received directly from the system or from the database or from the memory medium for determination of the trigger token.

The point in time specifies when the technical defect occurred. In particular the point in time comprises a date. In addition the time stamp can comprise a time of day. In particular the point in time is specified or embodied in a standardized format.

As an alternative the time can be specified in the form of a "remaining lifetime" of the system. The "remaining lifetime" in this case specifies a time interval up to the technical defect of the system. The time interval ends with the technical defect. The time interval can begin or start at any given time stamp from the logfile. In particular the time interval can begin at the earliest or at the latest time stamp comprised by the logfile. The time interval or the "remaining lifetime" can in particular be specified starting from each time stamp. In this case the time interval is different for different time stamps.

The technical defect can in particular be a failure of the system or the component of the system. As an alternative just regular maintenance can be necessary at the time of the technical defect.

In the method step of extraction of tokens from the subset of event descriptions the tokens are extracted based on a token category. In this case each token is contained as a character string in the subset of event descriptions.

During extraction the event descriptions are searched for tokens of the token category and separated from the event descriptions. In other words during extraction the event descriptions are searched for tokens that fall into the token category. Tokens found in this way are subsequently separated from the event descriptions In particular the tokens can be extracted based on more than one or different token categories. In other words the extraction of the tokens can be repeated for different token categories.

Each event description of the subset of event descriptions in this case is embodied as an overall character string. Each character string or overall character string in this case comprises a plurality of characters arranged next to one another or following on from one another. The extracted tokens are embodied as character string or part character string or sub-character string of an overall character string. In particular each extracted token is a part of at least one overall character string. In this case a token comprises a subset of the characters of the overall character string of at least one event description. In other words each token is comprised by at least one overall character string. A character string or an overall character string in this case can for example be composed or letters and/or digits and/or punctuation marks. In other words a character string or an overall character string can comprise at least one letter and/or at least one digit and/or at least one punctuation mark. The designation letter, digit or punctuation mark in this case defines a type of an individual character of the character string or of the overall character string. A digit in this case is a one-digit number.

The expression "extraction of a token from an event description" is thus synonymous with the expression "extraction of a token from an overall character string of an event description". A token comprised by an event description is thus also comprised by the logfile.

The token category can be based on the type of character. In particular during extraction of the tokens the characters of the overall character strings of the subset of event descriptions can then be subdivided according to their type. Then each token comprises characters of a specific type.

As an alternative the token category can predetermine a specific combination of types of character. As an alternative or in addition the token category can predetermine a specific number of characters comprised by a token of the token category. For example the token category can predetermine a fixed sequence of the type and a specific number of characters of a token of the token category. For example a token category can be or predetermine "four digits followed by two letters". Then, during extraction of the tokens, those character strings are extracted as tokens from the overall character strings that correspond precisely to the fixed sequence and/or number of characters that is predetermined by the token category.

Each of the extracted tokens in this case is assigned the time stamp of the event description from which it was extracted.

In the method step of determination of the trigger token the trigger token is determined from the extracted tokens. In this case more than one trigger token can in particular be determined from the extracted tokens.

The determination of the trigger token is based in this case on a correlation of the time stamps that are assigned to the extracted tokens and the point in time of the technical defect of the system. In particular the trigger token is an extracted token of which the assigned time stamp has a positive correlation with the point in time of the technical defect. Such a token will be referred to below as a "positively correlated token".

A positive correlation can in particular mean that the positively correlated token always occurs or arises in the logfile in a specific time interval before the technical defect of the system. In other words the occurrence of the positively correlated token and thus of its time stamp can be in a temporal relationship with the point in time of the technical defect of the system. As an alternative a positive correlation can mean that the positively correlated token in the logfile occurs at ever shorter distances in time or with increasing frequency before the technical defect of the system. As an alternative a positive correlation can mean that the positively correlated token occurs in the logfile at ever longer distances in time or with decreasing frequency before the technical defect of the system.

The trigger token is then a positively correlated token.

In the method step of provision of the trigger token the trigger token can in particular be stored. For example the trigger token can be stored or held in a database. As an alternative the trigger token can be provided by a system that uses the trigger token for an analysis of logfiles of systems or be stored on said system.

The inventor has recognized that an extraction of tokens from the event descriptions with the aid of token categories makes possible an analysis of diverse, non-standardized sized logfiles or volumes of data. The inventor has recognized that the most computing power is only necessary once for determination of the trigger token. Subsequently logfiles can merely be searched or analyzed for this trigger token. The inventor has recognized that a trigger token embodied as described above is suitable for predicting a point in time of a technical defect of a system. In this case the trigger token belongs to a token category and is positively correlated with the point in time of the technical defect of the system.

According to one aspect of an embodiment of the present invention, the token category is one of the following token categories: A sequence of letters, a number and/or an error code.

The token category thus defines a character string which the token extracted based on the token category should have. In other words the token category defines the type of characters which the token extracted based on the token category should have.

A token of the token category "sequence of letters" in this case comprises only characters of the type "letter".

A token of the token category "number" in this case comprises only characters of the type "digit". In this case a number is composed of one or more digits. In particular a token of the token category "number" can also comprise spaces and/or punctuation marks. A punctuation mark in this case is for example a comma or a period.

An error code is a fixed sequence of character types. As an alternative or in addition an error code can comprise a fixed number of characters. For example an error code can only comprise digits and letters, and comprise a maximum of six characters.

The inventor has recognized that the extraction of the tokens based on the token category can be carried out efficiently, in particular in respect of the computing capacity needed. The inventor has recognized that via a character-encoded logfile the extraction of the tokens is able to be realized easily and efficiently. The inventor has recognized that the token category can be defined in such a way that the tokens extracted based on the token category are suitable for prediction of the technical defect of the system.

According to a further aspect of an embodiment of the present invention, the subset of the event descriptions for extracting the tokens is filtered based on a regular expression. In this case the regular expression is based on a token category.

Regular expressions are known from the field of theoretical information technology. Regular expressions are known to be used as filter criteria in text searches.

In particular the token category can be described by a regular expression. The regular expression can specify a number and/or a type and/or a sequence of the character string predetermined by the token category.

The inventor has recognized that the known concept of regular expressions can be used or applied for extraction of the tokens. The inventor has recognized that in this way the extraction of the tokens can be carried out in an optimized way. The inventor has recognized that for this, by comparison with NLP, significantly less computing power is needed. The inventor has recognized that, by comparison with manual analysis of the logfiles, more trigger tokens can be determined and taken into account.

According to a further optional aspect of an embodiment of the present invention, the event descriptions of the subset of event descriptions are standardized before extraction of the tokens.

For this for example all spaces and/or all punctuation marks are removed from the event descriptions. As an alternative or in addition all uppercase letters can be converted to lowercase letters. As an alternative or in addition just one single type of character can be retained.

In this case the standardization can be dependent on the token category. For different token categories the event descriptions can be standardized in different ways. In this case the method step of extraction can be carried out separately for different token categories.

For example in advance of an extraction of tokens based on a token category that defines a sequence of letters, the event descriptions can be standardized in such a way that all uppercase letters are converted to lowercase letters and all characters except for letters and spaces are deleted or removed.

For example in advance of an extraction of tokens based on a token category that defines a number, the event descriptions can be standardized in such a way that only digits, spaces, commas and periods are retained.

The inventor has recognized that, through the standardization in advance of the extraction, the extraction can be speeded up and simplified. In particular in this way the event descriptions can already be adapted to the token category, based on which are to be extracted. The inventor has recognized that in this way for example it can be prevented that two actually identical tokens can be regarded as being different only because of a space or different uppercase and lowercase notation and therefore possibly be considered as not relevant.

According to a further aspect of an embodiment of the present invention, the method furthermore comprises a method step of grouping identical tokens extracted from different event descriptions. In this case the determination of the trigger token is based on a correlation of the time stamps assigned to the groups of extracted tokens with the point in time of the technical defect of the system.

An extracted token can be extracted from more than one event description of the subset of event descriptions. In other words the same sequence of characters can thus be comprised by a character string or sub-character string of more than one overall character string and be extracted from this. Thus, during extraction of the tokens, the same token or an identical token in a logfile can be extracted multiple times. In this case each of these tokens is assigned the time stamp of the event description from which it was extracted.

During grouping of the identical tokens identical or the same tokens that were extracted from more than one event description are grouped or collected together. In this case a token grouped in this way is assigned the time stamp of all event descriptions from which it was extracted. A group can thus be assigned one or more time stamps. Thus, for a grouped token, a temporal course of an occurrence of the token in the logfile can be analyzed. A grouped token is thus an extracted token to which one or more time stamps are assigned.

The determination of the trigger token depends in this case on the temporal course or a number of incidences or a frequency of the occurrence of the extracted tokens in the logfile or in the event descriptions corresponding to the trigger token. In this case the temporal course or the time stamps of the token extracted and grouped as described above are correlated with the point in time of the technical defect of the system. The trigger token is an extracted token for which a positive correlation of the assigned time stamp and the point in time of the technical defect is present. In other words the trigger token is an extracted token of which the temporal course is positively correlated with the point in time of the technical defect.

In this case positively correlated can for example mean that the time intervals between the time stamps of a token grouped and extracted in this way decrease with a decreasing distance in time to the technical defect. In other words the incidences of the occurrence of the tokens in the logfile or in the event descriptions corresponding to the trigger token can increase, the shorter the distance in time to the point in time of the technical defect becomes. In other words the frequency of the occurrence of the token corresponding to the trigger token can increase as the distance in time to the point in time of the technical defect decreases. As an alternative the distances in time between the time stamps can increase or the incidences and the frequency decrease.

The inventor has recognized that with the method described above a temporal course of an occurrence of a token in the logfile can also be analyzed. The inventor has recognized that this temporal course can be taken into account during determination of the trigger token. The inventor has recognized that the temporal course can be correlated with the point in time of the technical defect of the system for determination of the trigger token.

According to a further optional aspect of an embodiment of the present invention, the correlation of the time stamps assigned to the tokens with the point in time of the technical defect can be determined by application of a trained determination function to the time stamp.

In this case the trained determination function is applied to the time stamp or time stamps of an extracted token and to the point in time of the technical defect. In this case the trained determination function for each extracted token determines a strength of the correlation of the assigned time stamp or time stamps with the point in time of the technical defect of the system. An especially large correlation or a correlation strength above a predefined threshold value can then be referred to as a positive correlation.

In particular the trigger token can be determined as the extracted token of which the assigned time stamp(s), after application of the trained determination function, have the strongest or one of the strongest correlations with the point in time of the failure of the system.

In versions of embodiments of the present invention, a number of trigger tokens can be determined of which the correlation strength is greater than the threshold value.

The trained determination function can in particular be embodied as described in general below with regard to a trained function.

The inventor has recognized that the correlation with the aid of a trained determination function can be determined especially easily. The inventor has recognized that the trained determination function is capable of handling the large volumes of data. The inventor has recognized that the correlation for all extracted tokens coming into question can easily be determined with the trained determination function. The inventor has recognized that a trained determination function can be embodied to determine the correlation of all extracted tokens with the point in time of the technical defect. In this case the trained determination function is applied to the time stamp or time stamps assigned to an extracted token and the correlation, in particular the strength of the correlation, is determined. In this case it is not relevant which token is involved.

What is more, one or more embodiments of the present invention relate to a computer-implemented use of a trigger token provided as described above for automated maintenance of a system. The use comprises a method step of receipt of a logfile of the system. The use furthermore comprises a method step of determination of a first occurrence and/or a number of incidences of the trigger token in the logfile. The use furthermore comprises a method step of initiation of the maintenance of the system as a function of the first occurrence and/or of the number of incidences of the trigger token.

In the use of the trigger token the trigger token is used to analyze the logfile of the system and to predict a need for maintenance. In other words, based on the trigger token, the logfile of the system is analyzed and the need for maintenance is derived based on this. In other words the system is monitored based on the trigger token and the logfile, in order where necessary to initiate or introduce timely maintenance.

In the method step of receipt of the logfile the logfile is received from the system. In other words the logfile is provided by the system for receipt. As an alternative the logfile can be received from a database in which the system holds or stores the logfile.

As described above, the logfile in this case comprises a plurality of event descriptions. A subset of this plurality of event descriptions is in this case assigned a time stamp embodied as described above. In other words each event description of the subset is assigned a time stamp in each case.

In the method step of determination of a first occurrence and/or a number of incidences of the trigger token in the logfile at least the subset of the event description comprised by the logfile is searched for the trigger token.

In this case the trigger token defines that character string for which the overall character strings of the subset of event descriptions are searched. In this case each event description of the subset embodies an overall character string. In other words each event description corresponds to an overall character string. In particular the trigger token can define a regular expression for which the overall character strings are searched.

In this case each occurrence of the trigger token in the subset of the event descriptions can be determined or registered. In particular the time stamps of the event descriptions can be registered or determined that comprise the trigger token. In this case it can be determined when the trigger token occurs or is found for the first time in the logfile or in the subset of the event descriptions. As an alternative or in addition it can be determined how frequently the trigger token occurs in the subset of the event descriptions or is comprised by it. In this case the temporal course of the occurrence of the trigger token can be determined with the aid of the time stamp of the event descriptions comprising the trigger token.

Then, in the method step of initiation of the maintenance, depending on the first occurrence and/or the incidences of the trigger token in the logfile, the maintenance of the system is initiated.

In other words the maintenance can be initiated when the trigger token occurs for the first time in the logfile. As an alternative the maintenance can be initiated as a function of a number of incidences or a temporal course of the occurrence of the trigger token in the logfile. For example the maintenance can be initiated at the fifth or the tenth or the twentieth occurrence of the trigger token in the logfile. Any given alternative number of occurrences as trigger is naturally also conceivable.

The maintenance can in particular be initiated as a function of the correlation, known from the method for provision of the trigger token, of the time stamp assigned to the trigger token and the point in time of the technical defect. In other words it can be known from the correlation determined in the method when the technical defect arises as a function of a first occurrence and/or a number of incidences of the trigger token.

What is more a type of the technical defect that was predicted by the trigger token can be known from the correlation. The type of the technical defect can for example specify which component will fail.

In this case the maintenance can depend on the trigger token. In other words for different trigger tokens, depending on their respective occurrence in the logfile, different maintenances can be initiated. If for example the trigger token correlates with a technical defect of an x-ray tube, a maintenance of the x-ray tube can be initiated. In particular the maintenance is embodied in such a way that the technical defect of the system is prevented or the point in time of the technical defect is delayed.

Initiation of the maintenance in this case means that the maintenance is brought about technically. For this in particular a message can be sent to a service technician. As an alternative the initiation can be initiated maintenance system-intrinsically. In other words on initiation a process can be started within the system that carries out the maintenance automatically. In other words on initiation of the maintenance a program or a maintenance program can be started on the system. In particular the maintenance program can then carry out the maintenance.

The inventor has recognized that the occurrence of the trigger token in a logfile can be analyzed and the maintenance can be initiated as a function thereof. The inventor has recognized that the logfile of the system can be searched efficiently and rapidly for the trigger token. In particular this can be done continuously during the ongoing operation of the system. The inventor has recognized that the analysis of the logfile for the trigger token can be done in real time parallel to the creation of the logfile by the system. In this way it can be ensured that a trigger for maintenance, for example the first occurrence and/or for example an increasing or decreasing frequency of the trigger token, can be recognized in good time and maintenance can be initiated. The inventor has recognized that in this way a need for maintenance for preventing or delaying a technical defect can be recognized with little computing effort.

According to one aspect of an embodiment of the present invention, the use comprises a method step of an automated carrying out of the maintenance.

The maintenance in this case is carried out automatically by the system itself. The maintenance can in this case be carried out by a program or maintenance program executed on the system. For example the maintenance can be a restart of the system or a new adjustment of a component etc.

In this case the maintenance can be carried out before the technical defect occurs. In particular it can be taken into account when carrying out the maintenance whether the system is in use. For example the maintenance can be carried out automatically at a weekend or at night.

The inventor has recognized that, depending on the occurrence of the trigger token, the maintenance of the system can be initiated and carried out fully automatically. The inventor has recognized that thus neither a user of the system nor a service technician is necessary to initiate and/or to carry out the maintenance. The inventor has recognized that thus the system can be efficiently maintained and downtimes can be reduced or even avoided. Downtimes can occur during the wait for a service technician. The inventor has recognized that idle times of the system, i.e. times in which the system is not being used (for example at night or over the weekend), can be used for the maintenance.

According to a further aspect of an embodiment of the present invention, the system comprises an x-ray apparatus. In this case the x-ray apparatus comprises an x-ray tube. In this case the method step of automated carrying out of the maintenance in particular comprises an automated adjustment of the x-ray tube and/or a switchover of an operating mode of a focus of the x-ray tube.

The x-ray apparatus can in this case for example be a conventional x-ray system. As an alternative the x-ray apparatus can be a CT system or a C-arm system or a mammography system or an angiography system.

The x-ray tube can be a transmission x-ray tube or a rotating anode x-ray tube. The x-ray tube is in particular embodied to emit x-ray radiation.

In the automated adjustment of the x-ray tube an electron beam, which is embodied to create the x-ray radiation, can be refocused on a target. In order to guarantee operation of the x-ray tube this focus must be regularly readjusted. This readjustment can be initiated or carried out automatically as a function of the number of incidences or the first occurrence of a suitable trigger token in the logfile.

What is more, an x-ray tube can have different sizes of focus of the x-ray beam on the target. In other words a switch can be made between different focuses. Depending on the incidences or of the first occurrence of a suitable trigger token, the focus of the x-ray tube can be changed. In particular the focus can be changed when the current focus no longer functions because of a technical defect.

The inventor has recognized that, as a function of the occurrence of the frequency or of the first occurrence of the trigger token in the logfile, the function of the x-ray tube can be ensured. The inventor has recognized that the maintenance of the x-ray tube can be carried out automatically or in an automated way. In particular a need for the maintenance, the initiation of the maintenance and the carrying out of the maintenance can be undertaken in an automated manner, without manual support. The inventor has recognized that the maintenance can be initiated by starting a maintenance program on the system and the maintenance itself can be carried out in an automated manner by the maintenance program. The inventor has recognized that the maintenance in particular can comprise (re)adjustment of the x-ray tube and/or a switching of the focus.

According to a further aspect of an embodiment of the present invention, the use furthermore comprises a method step of determination of a probable point in time of an expected technical defect as a function of the time stamp assigned to the trigger token on first occurrence of the trigger token in the logfile. In this case the initiation of the maintenance depends on the time stamp assigned to the trigger token and the probable point in time of the expected technical defect of the system.

In particular, a relationship between the occurrence of the trigger token and/or the incidences of the trigger token in the logfile can be known from the correlation of the time stamp or the time stamps assigned to the trigger token and the point in time of the technical defect of the system. With this knowledge with the knowledge of the occurrence and/or of the number of incidences of the trigger token the probable point in time of the expected technical defect of the system can be derived from the occurrence and/or the number of incidences of the trigger token in the logfile. In other words the probable point in time of the expected technical defect can be extrapolated based on the occurrence and/or the number of incidences of the trigger token in the logfile.

In particular, the probable point in time of the expected technical defect can be a date and/or a time of day at which the technical defect is predicted to occur. As an alternative or in addition the point in time of the technical defect can comprise or specify a length of time until the expected technical defect. The length of time can specify a period of time for example between the latest time stamp in the logfile and the expected occurrence of the technical defect.

The maintenance can then be initiated in the step of initiation of the maintenance depending on the probable point in time of the expected technical defect. In this case the maintenance can be initiated before the expected technical defect arrives. In other words a point in time at which the maintenance is carried out can lie before the probable point in time of the expected technical defect. The maintenance in this case is initiated before or at the point in time of carrying out the maintenance. In particular the point in time of the initiation of the maintenance can lie within the length of time up to the expected technical defect.

The inventor has recognized that the probable point in time of the expected technical defect of the system can be derived or extrapolated as a function of the time stamp assigned to the trigger token or of the time stamps assigned to the trigger token. The inventor has recognized that in this way a preventive maintenance of the system can be initiated in order to avoid the technical defect or even a complete failure of the system.

According to an optional aspect of an embodiment of the present invention, the use comprises a method step of determination of a type of the technical defect as a function of the trigger token.

In other words it can be derived from the trigger token which technical defect is expected. The type of the technical defect or the type of the expected technical defect in this case specifies what or which component of the system is causing the technical defect. In this case different possible technical defects can be predicted by different trigger tokens. For example a technical defect of the x-ray tube can be predicted by a different trigger token in the logfile than a technical defect of the x-ray detector. What is more for example a different trigger token can predict a failure of a cooling pump rather than a failure of a filament of the x-ray tube. In other words a trigger token can be specific to a particular technical defect.

In versions of one or more embodiments of the present invention, one or more can be specific as a trigger token for a particular technical defect.

The initiated maintenance can then in particular be specific to the type of the technical defect. In other words, with the knowledge of the type of the technical defect, maintenance that is suitable for rectifying or preventing the specific, expected technical defect can be initiated directly.

The inventor has recognized that it can be derived from the trigger token which technical defect is expected. In this way a tailored, specific maintenance can be initiated in order to prevent or to rectify the expected technical defect. In particular a suitable maintenance program can be started. As an alternative the service technician can be given the appropriate information to ensure that he or she has the right equipment and/or spares for the maintenance in this case.

According to a further aspect of an embodiment of the present invention, the logfile comprises the trigger token multiple times. In this case the trigger token is assigned a time stamp for each occurrence in the logfile. In this case the initiation of the maintenance of the system depends on a temporal course of the occurrence of the trigger token.

In this case the trigger token is assigned the time stamp of each event description of the logfile that comprises the trigger token. The time sequence of the assigned time stamps describes the temporal course of the incidence or occurrence of the trigger token in the logfile or in the event descriptions comprised by the logfile. In this case for example the number of incidences of the occurrence of the trigger token can increase or decrease over time. In particular the temporal course can for example describe a frequency of the trigger token in the logfile. In other words the temporal course can describe how frequently in a specific time interval the trigger token occurs or arises in the logfile.

The initiation of the maintenance can then depend on the temporal course of the occurrence of the trigger token. For example it can be extrapolated based on the temporal course when the technical defect will occur according to expectation. In other words the probable point in time of the expected technical defect can be extrapolated based on the course. In particular the maintenance can be initiated as a function of the frequency of the occurrence or incidences of the trigger token in the logfile. In other words the maintenance can be initiated when the frequency falls below or exceeds a specific, predefined value. In particular the maintenance can be initiated as described above as a function of the probable point in time of the expected technical defect.

In particular the relationship between the temporal course of the occurrence of the trigger token and the point in time of the technical defect can be known from the correlation, which is determined in the method for determination of the trigger token.

The inventor has recognized that the logfile can also represent a temporal course of the trigger token. What is more the inventor has recognized that the temporal course can be used to predict the probable point in time of the expected technical defect of the system and to preventively initiate maintenance.

According to a further aspect of an embodiment of the present invention, the use comprises a method step of an application of a trained function to the time stamp assigned to the trigger token for determination of a probable point in time of a expected technical defect of the system. What is more the use comprises a method step of provision of the probable point in time of the expected technical defect of the system. In this case the initiation of the maintenance depends on the probable point in time of the expected technical defect of the system.

In the method step of application of the trained function output data is created based on input data via the trained function.

In this application the time stamps assigned to the trigger token correspond to the input data and the probable point in time of the expected technical defect corresponds to the output data.

In general a trained function emulates cognitive functions that connect humans to human thought. In particular training based on training data enables the trained function to adapt itself to new circumstances and also to recognize and extrapolate patterns.

In general parameters of a trained function can be adapted via trainings. In particular a supervised training, a semi-supervised training, an unsupervised training, a reinforcement learning and/or an active learning can be used for this. Over and above this representation learning (an alternate term is feature learning) can be used. In particular the parameters of the trained functions can be adapted iteratively by a number of training steps.

In particular a trained function can comprise a neural network, a support vector machine, a random tree or a decision tree and/or a Bayesian network, and/or the trained function can be based on k-means clustering), Q learning, genetic algorithms and/or association rules. In particular a trained function can comprise a combination of a number of uncorrelated decision trees or an ensemble of decision trees (random forest). In particular the trained function can be determined via XGBoosting (eXtreme Gradient Boosting). In particular a neural network can be a deep neural network, a convolutional neural network or a convolutional deep neural network. Over and above this a neural network can be an adversarial network, a deep adversarial network and/or a generative adversarial network. In particular a neural network can be a recurrent neural network. In particular a recurrent neural network can be a network with long short-term memory, (LSTM), in particular a Gated Recurrent Unit (GRU). In particular a trained function can comprise a combination of the approaches described. In particular the approaches for a trained function described here are called the network architecture of the trained function.

The probable point in time of the expected technical defect, as described above, specifies when the technical defect of the system is likely to occur. As an alternative the probable point in time of the expected technical defect, as described above, can specify a length of time until the technical defect of the system.

The time stamps assigned to the trigger token serve as input data of the trained function. The trained function is embodied, based on the input data, to determine the probable point in time of the expected technical defect. This probable point in time of the expected technical defect is then provided.

Then, depending on the probable point in time of the expected technical defect, as described above, the maintenance can be initiated. In other words a point in time of the initiation and/or of the carrying out of the maintenance can depend on the probable point in time of the expected technical defect.

The inventor has recognized that the probable point in time of the expected technical defect can be determined by application of a trained function. The inventor has recognized that regularities in the occurrence of the trigger token depending on a need for maintenance can be recognized and used to predict the probable point in time of the expected technical defect with a trained function.

According to a further optional aspect of an embodiment of the present invention, the initiation of the maintenance is adapted to a schedule of a service technician.

In particular, in this exemplary embodiment the maintenance can at least partly be carried out manually. In particular the initiation of the maintenance can comprise a notification to a service technician. As an alternative the initiation of the maintenance can comprise an entry in a schedule or calendar of the service technician as to when he or she should carry out the maintenance. The schedule of the service technician in this case comprises information as to when the service technician is already booked or blocked and when he or she has free time.

In this case, depending on a probable point in time of the expected technical defect determined as described above and of the schedule of the service technician, an optimum point in time or due date for the maintenance of the system can be determined. This due date can be blocked automatically in the schedule of the service technician for carrying out the maintenance.

In particular, it can be determined from the type of the technical defect embodied as described above which maintenance or which type of maintenance is to be carried out and how long this lasts. The type of maintenance and/or the duration of the maintenance can be taken into account when entering the point in time of the maintenance into the schedule of the service technician. In particular at least the type of the maintenance can also be entered into the schedule of the service technician.

In particular, during the entry into the schedule of the service technician a location can be taken into account at which the system is positioned or at which the system is located. In this case the taking into account of the location can comprise that the point in time of the maintenance is selected such that the service technician in accordance with their schedule is in the vicinity of the location of the system. For this the schedule of the service technician for the blocked times comprises information as to where the service technician is located at these times.

The inventor has recognized that the use can also be utilized for an optimization of the schedule of the service technician. In particular in this way an idle time and/or traveling times of the service technician can be reduced. The inventor has recognized that by the entry of the type of maintenance it can be ensured that the service technician has all spare parts and/or tool that might be necessary for the maintenance in this case.

What is more, one or more embodiments of the present invention relate to a computer-implemented use of a trigger token provided as described above for provision of a trained function. In this case the use of the trigger token provided for provision of the trained function comprises a method step of receipt from a system of the time stamps assigned to the trigger token provided. The use furthermore comprises a method step of receipt of a point in time of a technical defect of the system. The use furthermore comprises a method step of determination of a probable point in time of an expected technical defect of the system by application of the trained function to the time stamp. The use furthermore comprises a method step of adaptation of at least one of the parameters of the trained function based on a comparison of the probable point in time determined and of the point in time received. The use furthermore comprises a method step of provision of the trained function.

In this case the trained function is embodied, in a computer-implemented use of the trigger token provided, to be used as described above for automated maintenance.

The trained function can be embodied in this case as described above. The trained function is trained via supervised training. In this case, by application of the trained function to input data, specific input data is compared with the so-called ground truth. The trained function or the at least one parameter of the trained function is adapted iteratively during the training so that, by the application of the trained function specific output data matches the ground truth as well as possible.

In the described use the input data corresponds to the time stamps assigned to the trigger token. In this case more than one time stamp can be assigned to the trigger token. In particular the trigger token is assigned a time stamp as described above for each occurrence or incidence in a logfile of the system. The time stamps can be received from the system directly. As an alternative the time stamps can be received from a database.

In this case the output data is the probable point in time of the expected technical defect of the system determined by application of the trained function to the time stamps.

The ground truth is the (actual) point in time of the technical defect of the system that is received. The point in time received in this way can be received with the time stamps in this case.

For training the trained function the probable point in time of the expected technical defect determined is compared with the received point in time of the technical defect. In this case the trained function or its at least one parameter is adapted such that, in a new application of the trained function to the time stamps, the probable point in time better matches the received point in time.

In particular the training embodied in such a way can be repeated for a plurality of time stamps of the trigger token of different systems and the trained function iteratively adapted in this way.

The trained function is provided in the method step of provision in such a way that it can be used for a use of the trigger token provided described above for automated maintenance of a system.

The trained function can be specific to a particular trigger token. For different trigger tokens different functions can be trained as described above.

In this case "trained function" is used synonymously with "trainable function". In particular the trained function can already be pre-trained. As an alternative or in addition the trained function can be continually further trained.

The inventor has recognized that a function for prediction of the probable point in time of the expected technical defect can be trained. The inventor has recognized that the function can be trained via supervised training. The inventor has recognized that the function trained in this way can be applied in a use of the trigger token provided for automated maintenance.

What is more, one or more embodiments of the present invention relate to a provision system for provision of a trigger token. In this case the trigger token correlates with a need for maintenance of a system. In this case the system comprises an interface and a computing unit. In this case the interface is embodied for receiving a logfile of the system. In this case the logfile comprises a plurality of event descriptions. In this case a subset of the plurality of event descriptions is assigned a time stamp. In this case the interface is furthermore embodied for receipt of a point in time of a technical defect of the system. In this case the computing unit is embodied for extraction of tokens from the subset of the event descriptions based on a token category. In this case each of the extracted tokens is contained as a character string in the subset of event descriptions. In this case the computing unit is furthermore embodied for determination of the trigger token from the extracted tokens based on a correlation of the time stamps assigned to the extracted tokens with the point in time of the technical defect of the system, so that the time stamp assigned to the trigger token and the point in time of the technical defect of the system are positively correlated. In this case the interface is furthermore embodied for provision of the trigger token.

Such a provision system can in particular be embodied to carry out the previously described method for provision of a trigger token and its aspects. The provision system is embodied to carry out this method and its aspects by the interface and the computing unit being embodied to execute the corresponding method steps.

One or more embodiment of the present invention furthermore relate to a medical apparatus, in particular an x-ray apparatus. The medical apparatus comprises a provision system as described above.

The x-ray apparatus can in particular be a conventional x-ray system or a CT system or a C-arm system or a mammography system or an angiography system. In particular the x-ray apparatus comprises at least one x-ray tube and an x-ray detector.

One or more embodiments of the present invention optionally relate to a use system for use of a trigger token provided to a provision system described above for automated maintenance of a system. The use system comprises an interface and a computing unit. In this case the interface is embodied for receipt of a logfile of the system. In this case the computing unit is embodied for determination of a first occurrence and/or a number of incidences of the trigger token in the logfile. In this case the interface and/or the computing unit are embodied for initiating the maintenance of the system as a function of the first occurrence and/or the number of incidences of the trigger token.

Such a use system can in particular be embodied to carry out the previously described use of a trigger token provided with a provision system described above for automated maintenance of a system. The use system is embodied to carry out this use and its aspects by the interface and the computing unit being embodied to execute the corresponding method steps.

In particular, the medical apparatus described above, as an alternative or in addition to the provision system, can comprise the use system.

What is more, one or more embodiments of the present invention optionally relates to a training system for use of a trigger token provided with a provision system described above for provision of a trained function. In this case the trained function is embodied, for a computer-implemented use of the trigger token provided, to be applied for automated maintenance with a use system described above. In this case the training system comprises an interface and a computing unit. In this case the interface is embodied for receiving the time stamps assigned to the trigger token provided from a system. In this case the interface is furthermore embodied for receipt of a point in time of a technical defect of the system. In this case the computing unit is embodied for determination of a probable point in time of an expected technical defect of the system by application of the trained function to the time stamp. In this case the computing unit is furthermore embodied for adaptation of at least one of the parameters of the trained function based on a comparison of the probable point in time determined and of the received point in time. In this case the interface is furthermore embodied for provision of the trained function.

Such a training system can in particular be embodied to carry out the provision system described for provision of the trigger token provided for provision of the trained function. The training system is embodied to carry out this use and its aspects by the interface and the computing unit being embodied to carry out the corresponding method steps.

In particular the medical apparatus described above, as an alternative or in addition to the provision system and/or the use system, can comprise the training system.

One or more embodiments of the present invention also relate to a computer program product with a computer program and also a computer-readable medium. A largely software-based realization has the advantage that even provision systems and/or use systems and/or training systems used previously can be upgraded in a simple way by a software update in order to work in the way described. Such a computer program product, as well as the computer program, can where necessary comprise additional elements such as e.g. documentation and/or additional components, as well as hardware components, such as e.g. hardware keys (dongles etc.) for use of the software.

In particular, one or more embodiments of the present invention also relate to a computer program product with a computer program, which is able to be loaded directly into a memory of a provision system and/or the use systems and/or training systems, with program sections for carrying out all steps of the method described above and/or of the uses described above and their aspects when the program sections are executed by the provision system and/or use systems and/or training systems.

In particular, one or more embodiments of the present invention relate to a computer-readable memory medium on which program sections able to be read and executed by a provision system and/or use systems and/or training systems are stored for carrying out all steps of the method described above and/or of the uses described above and their aspects when the program sections are executed by the provision system and/or use systems and/or training systems.

BRIEF DESCRIPTION OF THE DRAWINGS

The characteristics, features and advantages of this invention described above will become clearer and easier to understand in conjunction with the following figures and their descriptions. In this case the figures and descriptions are not intended to restrict the present invention and its forms of embodiment in any way.

In different figures the same components are provided with corresponding reference characters. The figures are as a rule not true-to-scale.

In the figures

Figure 1:
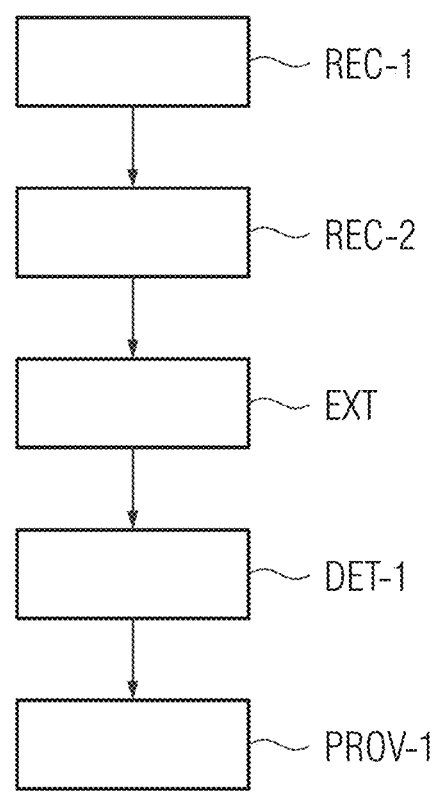
Figure 7:
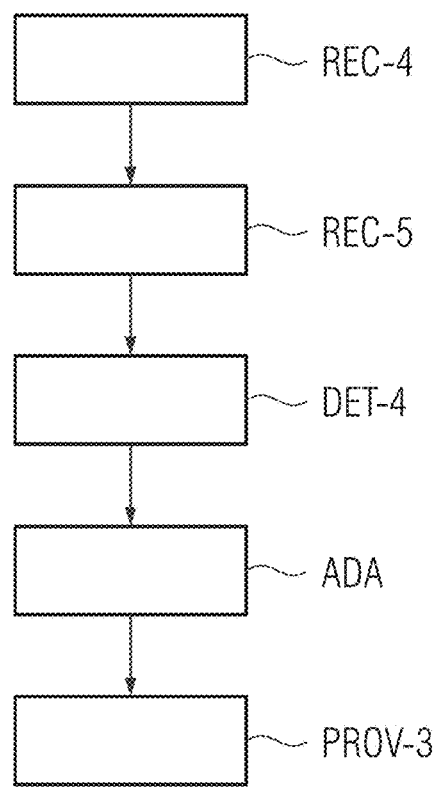
Figure 8:
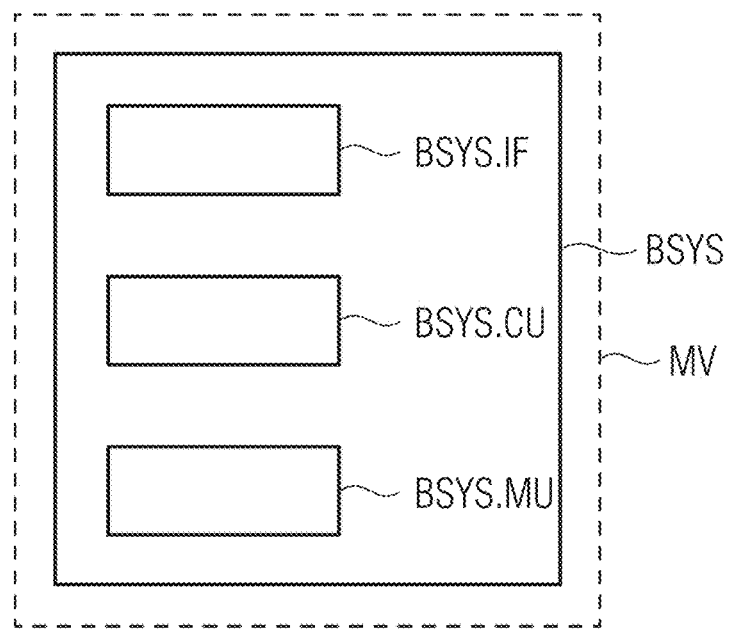
Figure 9:
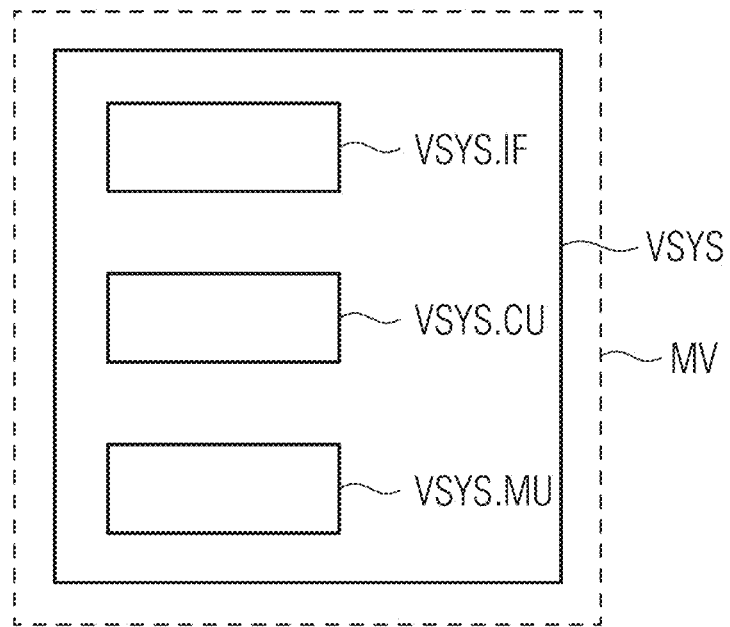
Figure 10:
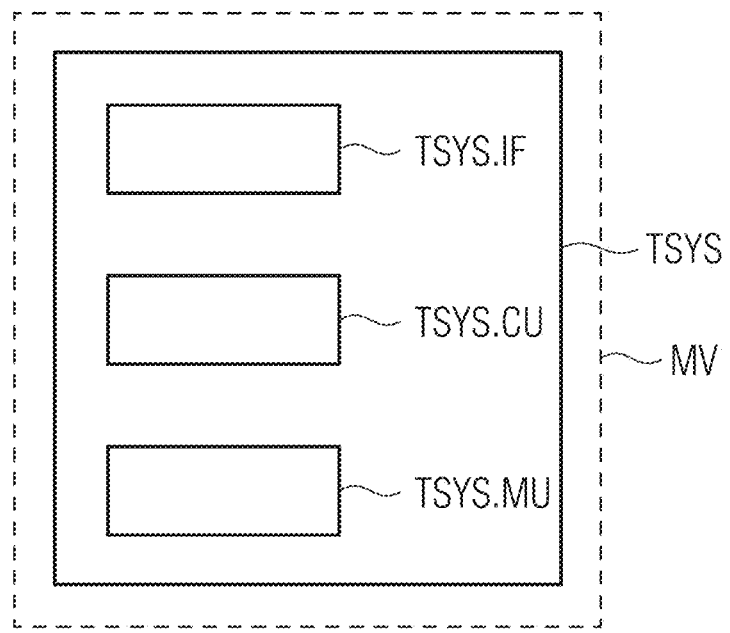

FIG. 1 shows a first exemplary embodiment of a computer-implemented method for provision of a trigger token, FIG. 2 shows a second exemplary embodiment of a computer-implemented method for provision of a trigger token, FIG. 3 shows a first exemplary embodiment of a computer-implemented use of a trigger token provided for automated maintenance of a system, FIG. 4 shows a second exemplary embodiment of a computer-implemented use of a trigger token provided for automated maintenance of a system, FIG. 5 shows a third exemplary embodiment of a computer-implemented use of a trigger token provided for automated maintenance of a system, FIG. 6 shows a fourth exemplary embodiment of a computer-implemented use of a trigger token provided for automated maintenance of a system, FIG. 7 shows an exemplary embodiment of a computer-implemented use of a trigger token provided for provision of a trained function, FIG. 8 shows a provision system for provision of a trigger token, FIG. 9 shows a use system for use of the trigger token provided for automated maintenance of a system, and FIG. 10 shows a training system for use of the trigger token provided for provision of a trained function.

DETAILED DESCRIPTION

FIG. 1 shows a first exemplary embodiment of a computer-implemented method for provision of a trigger token.

In a method step of receipt REC-1 of a logfile a logfile of a system is received. The logfile in this case comprises a plurality of event descriptions. An event description can be triggered by an event of the system. An event description can for example be a status message of the system or a component of the system. The triggering event can thus be a status interrogation or a status message. As an alternative an event description can for example describe a use of the system. The triggering event can thus be a use of the system. For example the use of the system can be described in the event description by a type of the use and/or by a setting of a (system) parameter for the use and/or by a striking feature in the use. A subset of the event descriptions is assigned a time stamp. In other words each event description of the subset of event descriptions is assigned a time stamp. The logfile thus comprises a pair consisting of event description and assigned time stamp for the subset of event descriptions in each case. The time stamp specifies when the event that has triggered the corresponding event description has taken place. As an alternative the time stamp can specify when the event description was entered into the logfile. The time stamp specifies a date. In particular the time stamp can specify a time of day. The time stamp can be specified in a standardized format. The logfile is character-coded.

The system is a medical system, for example a medical imaging system. In particular the system can be an x-ray system or a CT system or a C-arm system or a mammography system or an angiography system or an MRT system or a ultrasound system etc. In particular the system can thus be a medical apparatus, in particular an x-ray apparatus. The x-ray apparatus in this case is a conventional x-ray system or a mammography system or an angiography system or a C-arm system or a CT system.

The logfile can be received directly from the system. In other words the system itself can provide the logfile for receipt. The logfile can alternatively be received from a database. The database can in this case be received locally or in a Cloud system. As an alternative the logfile can be received or downloaded from a memory medium.

In a method step of receipt REC-2 of a point in time of a technical defect of the system the point in time at which a technical defect of the system has occurred is received. The point in time of the technical defect, like the logfile as well, can be received from the system itself or from a database or from a memory medium. The point in time of the technical defect specifies a date at which a technical defect of the system has occurred. The point in time can also specify a time of day of the technical defect. The technical defect can for example be a failure of the system or of a component of the system. As an alternative the technical defect can also just be necessary maintenance of the system or a component of the system as a result of a runtime for example.

In versions of embodiments of the present invention the point in time of the technical defect can also be specified as a time interval up to the technical defect of the system. In other words the point in time of the technical defect can specify a "remaining lifetime" of the system. In other words the time interval is the "remaining lifetime" of the system. The time interval ends with the technical defect of the system. The time interval can start at a time stamp comprised by the logfile. For example the time interval can start at the earliest or at the latest time stamp comprised by the logfile.

In a method step of extraction EXT of tokens from the subset of event descriptions tokens are extracted from the event descriptions of the subset based on a token category.

Each event description forms an overall character string in each case. The overall character string comprises at least one character. In particular the overall character string comprises a number of characters arranged next to one another. A character can for example be a letter or a digit or a punctuation mark or a space.

A letter in this case can be any given letter of the alphabet from a to z. A digit in this case can be any given one-digit number between 0 and 9. A punctuation mark can for example be a period, a comma, a hyphen, an underscore, a forward slash etc.

A token is likewise a character string that comprises at least one of the above-mentioned characters. Each extracted token is comprised in this case by at least one overall character string. In other words each extracted token is comprised by at least one event description.

Each extracted token in this case is assigned the time stamp of the event description from which it was extracted.

Before the extraction of the tokens the overall character strings of the event descriptions can be processed or standardized. To do this all uppercase letters can be converted into lowercase letters. As an alternative or in addition only letters can still be retained. As an alternative only digits can still be retained. As an alternative digits and punctuation marks can be retained etc. The processing or standardization of the overall character strings depends on the token category in this case.

The token category in particular specifies a form of the character string to be extracted. In other words the token category specifies which type of character the extracted tokens are to comprise. As an alternative or in addition the token category can specify how many characters the extracted tokens are to comprise. In versions of one or more embodiments of the present invention, the token category can be a sequence of letters and/or a number and/or an error code.

A sequence of letters comprises at least one letter. In particular a sequence of letters comprises only coherent letters. A number comprises at least one digit. In particular a number can also comprise punctuation marks. An error code can be defined by a specific composition of characters. For example an error code can be defined by the fact that it only comprises letters and digits and comprises precisely six characters overall.

The extraction can be carried out for different token categories.

For extraction of the tokens the subset of the event descriptions can be filtered based on a regular expression. The regular expression is based on the token category. In other words the regular expression can be predetermined by the token category. Regular expressions are known in particular from the field of theoretical information technology.

In a method step of determination DET-1 of the trigger token the trigger token is determined form the extracted tokens. In other words the trigger token is one of the extracted tokens. The determination DET-1 of the trigger token is based on a correlation between the time stamps assigned to the extracted tokens and the point in time of the technical defect of the system. In other words a correlation between the correspondingly assigned time stamp and the point in time of the technical defect of the system is determined for each extracted token. The time stamp of the token that is determined as the trigger token is positively correlated with the point in time of the technical defect. For example "positively correlated" can mean that the corresponding token always occurs in a specific interval before the technical defect of the system. As an alternative "positively correlated" can mean that the corresponding token never arises or occurs in a specific interval before the technical defect of the system. In other words "positively correlated" means that there is a temporal relationship between an occurrence of the positively correlated token in the logfile and the point in time of the technical defect. In particular more than one trigger token can be specified.

In versions of one or more embodiments of the present invention, the correlation between at least one time stamp of any given extracted token and the point in time of the technical defect of the system can be determined by application of a trained determination function to the at least one time stamp and the point in time of the technical defect. The determination function can in particular be trained or learned in this case with one of the methods described above. The trained determination function is embodied to determine a strength of the correlation. In particular the determination function can be embodied to recognize whether the token is a trigger token.

In a method step of provision PROV-1 of the trigger token the trigger token is provided for a use. The trigger token can in particular be stored on a server, in particular in a database on the server. As an alternative the trigger token can be stored on a memory medium and provided in this way.

FIG. 2 shows a second exemplary embodiment of a computer-implemented method for provision of a trigger token.

The method steps of receipt REC-1 of a logfile, of receipt REC-2 of a point in time of a technical defect, of extraction EXT of tokens, of determination DET-1 of the trigger token and of provision PROV-1 of the trigger token are embodied in a similar way to the description for FIG. 1.

The method additionally comprises a method step of a grouping GRP of identical tokens extracted from different event descriptions. A token can arise or occur more than once in a logfile. In this case the token occurs in a number of different event descriptions of the logfile. In other words a number of event descriptions comprise the same or an identical token. This means that the token was entered in the logfile at a number of different points. The token can thus be assigned the time stamps of all event descriptions that comprise the token. In the method step of grouping GRP such tokens occurring or arising multiple times are grouped. A group of an extracted token thus corresponds to a token that has been extracted once or a number of times and to which the one or more time stamps can thus be assigned. Thus a temporal course of the occurrence of a such tokens in the logfile can be analyzed when the token is assigned more than one time stamp.

The correlation of the time stamps of the individual tokens with the point in time of the technical defect for determination of the trigger token is then based on the time stamps assigned to the extracted tokens. In other words a correlation between the assigned time stamp or time stamps and the point in time of the technical defect of the system can be determined for the time stamp of each token. In this way for example it can be established whether a number of incidences of the occurrence of the corresponding token increases or decreases as the distance in time to the point in time of the technical defect decreases. In other words it can be analyzed whether a frequency of the occurrence of a token grouped in this way in the logfile increases or decreases as the distance in time to the point in time of the technical defect decreases. The frequency describes the occurrence or incidences of the token within a specific time interval. A positive correlation can then be characterized by an increase or a decrease of the frequency as the distance in time to the point in time of the technical defect of the system decreases.

The trigger token is then a token of which the occurrence or incidences in the logfile correlates with the point in time of the technical defect. For example, as the distance in time to the point in time of the technical defect decreases the trigger token can occur or be present ever more frequently or ever less frequently in the log file.

FIG. 3 shows a first exemplary embodiment of a computer-implemented use of a trigger token provided for automated maintenance of a system.

The trigger token is provided with a method that is embodied in accordance with the descriptions for FIGS. 1 and 2.

In a method step of receipt REC-3 of a logfile, the logfile of the system that is to be monitored is receive and its maintenance is to be initiated where necessary. In this case the logfile can be received directly from the system or transmitted from a database or a memory medium. The logfile can in particular be received in real time. In other words the logfile can be received continuously and analyzed or evaluated as described below and where necessary maintenance needed can be initiated in a timely manner. In other words changes to the logfile can be received continuously.

In this case the logfile is embodied as described with regard to FIG. 1. The logfile thus comprises a plurality of event descriptions. In this case at least one subset of the event descriptions is assigned a time stamp in each case. The logfile thus comprises pairs of event descriptions with assigned time stamps.

In a method step of determination DET-2 of a first occurrence and/or an incidence of the trigger token in the logfile, the logfile is searched for the trigger token and the occurrence of the trigger token analyzed. In particular the event descriptions of the logfile can be processed or standardized for this in advance, as they are before the extraction EXT of the tokens, as described with regard to FIG. 1. In particular it can be determined in the method step when the trigger token occurs for the first time in the logfile. Depending on the trigger token, it can be derived from this when the technical defect of the system is predicted to occur. When the trigger token occurs in more than one event description of the logfile or can be determined more than once in the logfile, the number of incidences of the occurrence of the trigger token can be analyzed. In particular the number of incidences can be analyzed as a function of the time, i.e. the frequency of the occurrence of the trigger token. For this the time stamps of the event descriptions that comprise the trigger token are evaluated. Then, depending on the number of incidences or the frequency of the occurrence of the trigger token, a predicted point in time of the expected technical defect can be determined or derived.

What is more, in versions of one or more embodiments of the present invention, it can be derived from the type of the trigger token which technical defect will occur. Various technical defects of the system can be characterized by different trigger tokens.

In a method step of initiation INI of the maintenance of the system the maintenance is initiated as a function of the first occurrence and/or the number of incidences of the trigger token in the logfile. The initiation INI of the maintenance can in this case for example comprise starting a maintenance program on the system. As an alternative the initiation INI of the maintenance can comprise informing a service technician about the need for maintenance of the system.

The maintenance in this case is initiated before the probable point in time of the expected technical defect. In other words the maintenance is initiated in such a way that the technical defect can be prevented or at least delayed.

The operability of the technical system is to be ensured by the maintenance.

In versions of one or more embodiments of the present invention, on initiation INI of the maintenance, a loading or a use of the system can be taken into account. For example the maintenance can be initiated in such a way that it is carried out at the weekend or at night when the system is not being used.

FIG. 4 shows a second exemplary embodiment of a computer-implemented use of a provided trigger token for automated maintenance of a system.

The method steps of receipt REC-3 of the logfile of the system, of determination DET-2 of the first occurrence and/or of the number of incidences of the trigger token in the logfile and of initiation INI of the maintenance are embodied in a similar way to the description of the exemplary embodiment in FIG. 3.

The use of the trigger token provided furthermore comprises a method step of an automated performance PERF of the maintenance. The maintenance can thus be initiated and performed automatically. The automatic performance PERF of the maintenance can for example comprise an execution of a computer-implemented maintenance program.

For example the system can be an x-ray apparatus. The x-ray apparatus can in this case for example be a conventional x-ray system or a mammography system or an angiography system or a CT system or a C-arm system. Such an x-ray apparatus comprises an x-ray tube. The x-ray tube can in this case for example be a transmission x-ray tube or a rotating anode x-ray tube. To create x-ray radiation an electron beam is focused on a target. When the electron beam is braked at the target the x-ray radiation is created. The electrons of the electron beam emerge as a result of the thermionic effect from what is known as a filament, and are subsequently accelerated in an electrical field. The automated performance PERF of the maintenance can then for example comprise an automated adjustment of the x-ray tube. In other words the automated performance PERF of maintenance can comprise starting a maintenance program for adjustment of the electron beam on the target. In this case the focus of the electron beam on the target can be focused or adjusted. As an alternative or in addition the automated performance PERF of the maintenance can comprise a switchover of the operating mode of a focus of the x-ray tube. The focus of the x-ray tube corresponds to the point at which the electron beam hits the target. Typically a selection can be made between two or three focus sizes for an x-ray tube. The different focus sizes are predetermined by different operating modes. The automated performance PERF of the maintenance can than comprise an automated switchover between the focus sizes. For example the operating modes, i.e. the focus size, can be switched or changed when a focusing with a specific size is no longer possible because of technical problems. For automated performance PERF of the maintenance a maintenance program can also be carried out, which automates the operating mode of the x-ray tube with regard to the focus size. The cases described are to be considered as examples. Other similar automated maintenance is conceivable.

In particular the maintenance program that is to be executed can be determined as a function of the trigger token. Various trigger tokens can initiate the execution of various maintenance programs, which will subsequently be performed automatically.

FIG. 5 shows a third exemplary embodiment of a computer-implemented use of a trigger token provided for automated maintenance of a system.

The method steps of receipt REC-3 of the logfile of the system, of determination DET-2 of the first occurrence and/or the number of incidences of the trigger token in the logfile and of initiation INI of the maintenance are embodied in a similar way to the description of the exemplary embodiment in FIG. 3. The method step of automated performance PERF of the maintenance of the system can optionally be embodied as described in accordance with FIG. 4.

The use furthermore comprises a method step of determination DET-3 of a probable point in time of an expected technical defect of the system as a function of the time stamp assigned to the trigger token on first occurrence of the trigger token in the logfile. In particular it can be known from the correlation that was determined in the method for provision of the trigger token how long after the first occurrence of the trigger token in the logfile the technical defect of the system occurs. In other words a typical value for a distance in time between the time stamp assigned to the trigger token on first occurrence and the point in time of the technical defect can be known. From this the probable point in time of the expected technical defect of the system can be determined when the trigger token occurs for the first time in the logfile.

The initiation INI of the maintenance then depends on the time stamp assigned to the trigger token and the probable point in time of the expected technical defect of the system. The maintenance can be initiated in the time interval between the time stamp and the probable point in time of the expected technical defect. In particular the maintenance can be initiated and where necessary also performed before the technical defect occurs.

FIG. 6 shows a fourth exemplary embodiment of a computer-implemented use of a trigger token provided for automated maintenance of a system.

The method steps of receipt REC-3 of the logfile of the system, of determination DET-2 of the first occurrence and/or the number of incidences of the trigger token in the logfile and of initiation INI of the maintenance are embodied in a similar way to the description of the exemplary embodiment in FIG. 3. The method step of automated performance PERF of the maintenance of the system can optionally be embodied as described in accordance with FIG. 4.

The logfile can comprise the trigger token multiple times. In this case the logfile comprises the trigger tokens from more than one event description. The event descriptions in this case are each assigned a time stamp. The time stamps of the event descriptions that comprise the trigger token are also assigned to the trigger token. The time stamps assigned to the trigger token then describe a temporal course of the occurrence or incidence of the trigger token in the logfile. The initiation INI of the maintenance of the system depends in this case on the temporal course, i.e. on the time stamps assigned to the trigger token.

The use comprises a further method step of application APP of a trained function to the time stamp assigned to the trigger token. In this case a probable point in time of an expected technical defect of the system is determined. The trained function is based in this case a machine-learning algorithm. The trained function is embodied to derive from the temporal course of the time stamps assigned to the trigger token when the technical defect will probably occur. The trained function can have been trained as described with regard to FIG. 7.

The use comprises a further method step of provision PROV-2 of the probable point in time of the expected technical defect. The initiation INI of the maintenance then depends on the probable point in time of the expected technical defect. In this case the maintenance is initiated in a time interval before the probable point in time of the expected technical defect. The maintenance can in particular be initiated in a time interval between the time stamp of the newest event description in the logfile and the probable point in time of the expected technical defect. The maintenance in this case is initiated in such a way at the right time for the technical defect to be able to be prevented or at least delayed.

FIG. 7 shows an exemplary embodiment of a computer-implemented use of a trigger token provided for provision of a trained function.

The trigger token is provided with a method that is embodied in accordance with the descriptions for FIGS. 1 and 2.

The trained function is embodied to be applied in a use in accordance with the description for FIG. 6.

The use of the trigger token provided for provision of the trained function comprises a method step of receipt REC-4 of the time stamps assigned to the trigger token provided. In this case more than one time stamp is assigned to the trigger token, as described with regard to FIG. 6. The time stamps have been determined based on a logfile of a system, as described above. The time stamps represent a temporal course of an occurrence or incidence of the trigger token in the logfile of the system. The logfile in this case is embodied as described with regard to FIG. 1. The time stamps can be embodied in a standardized form. In this case the time stamps specify a date. In particular the time stamps can additionally specify a time of day.

The use also comprises a method step of receipt REC-5 of a point in time of a technical defect of the system. The point in time specifies a date of the technical defect of the system. In particular the point in time can additionally specify a time of day of the technical defect of the system. In versions of one or more embodiments of the present invention, the point in time of the technical defect can also be specified as a time interval up to the technical defect of the system. The technical defect thus defines the end of the time interval. The start of the time interval can be defined either by the earliest or the latest time stamp in the logfile. As an alternative the start of the time interval can be defined for example by the time stamp of the first or of the last occurrence of the trigger token in the logfile.

The use comprises a further method step of determination DET-4 of a probable point in time of an expected technical defect of the system by application of the trained function to the time stamps. In other words the time stamps assigned to the trigger token serve as input data of the trained function. The output data of the trained function comprises the probable point in time of the expected technical defect of the system.

The use furthermore comprises a method step of adaptation ADA of at least one parameter of the trained function based on a comparison of the probable point in time of the expected technical defect determined and the received point in time of the technical defect. In this case the at least one parameter is adapted in such a way that, when the trained function is applied to the time stamp once again, the probable point in time determined and the received point in time are a better match. This step is repeated until such time as an abort criterion is reached. The abort criterion can for example be a maximum number of repetitions and/or falling below a maximum deviation between the probable point in time determined and the received point in time. This process is referred to as learning or training of the trained function.

In a method step of provision PROV-3 of the trained function the function trained in this way is provided for a use. In particular the trained function can be provided for a use in accordance with the description for FIG. 6.

FIG. 8 shows a provision system BSYS for provision of a trigger token. FIG. 9 shows a use system VSYS for use of the trigger token provided for automated maintenance of a system. FIG. 10 shows a training system TSYS for use of the trigger token provided for provision of a trained function.

The provision system BSYS for provision of a trigger token shown is embodied to carry out an inventive method for provision of a trigger token. The provision system BSYS comprises a provision interface BSYS.IF, a provision computing unit BSYS.CU and a provision memory unit BSYS.MU. The use system VSYS shown is embodied for carrying out an inventive use of the trigger provided token for automated maintenance of a system. The use system VSYS comprises a use interface VSYS-IF, a use computing unit VSYS.CU and a use memory unit VSYS-MU. The training system TSYS shown is embodied for carrying out an inventive use of the provided trigger token for provision of a trained function. The training system TSYS comprises a training interface TSYS-IF, a training computing unit TSYS.CU and a training memory unit TSYS-MU.

The provision system BSYS and/or the use system VSYS and/or the training system TSYS can in particular be a computer, a microcontroller or an integrated circuit (IC). As an alternative the provision system BSYS and/or the use system VSYS and/or the training system TSYS can be a real or virtual computer network (a technical term for a real computer network is "cluster", a technical term for a virtual computer network is "Cloud"). The provision system BSYS and/or the use system VSYS and/or the training system TSYS can be embodied as a virtual system, which is executed on a computer or a real computer network or a virtual computer network (a technical term is "virtualization").

The provision interface BSYS.IF and/or the use interface VSYS.IF and/or the training interface TSYS.IF can be a hardware or software interface (for example a PCI bus, USB or Firewire). The provision computing unit BSYS.CU and/or the use computing unit VSYS.CU and/or the training computing unit TSYS.CU can comprise hardware and/or software components, for example a microprocessor or what is known as an FPGA (Field Programmable Gate Way). The provision memory unit BSYS.MU and/or the use memory unit VSYS.MU and/or the training memory unit TSYS.MU can be embodied as non-permanent Random Access Memory (RAM) or as permanent mass storage (hard disk, USB stick, SD card, Solid State Disk (SSD).

The provision interface BSYS.IF and/or the use interface VSYS.IF and/or the training interface TSYS.IF can in particular comprise a plurality of sub-interfaces, which use or carry out different method steps of the respective inventive method. In other words the provision interface BSYS.IF and/or the use interface VSYS.IF and/or the training interface TSYS.IF can be embodied as a plurality of provision interfaces BSYS.IF and/or the use interfaces VSYS.IF and/or the training interfaces TSYS.IF. The provision computing unit BSYS.CU and/or the use computing unit VSYS.CU and/or the training computing unit TSYS.CU can in particular comprise a plurality of sub-computing units which use or carry out different method steps of the respective inventive method. In other words the provision computing unit BSYS.CU and/or the use computing unit VSYS.CU and/or the training computing unit TSYS.CU can be embodied as a plurality of provision computing units BSYS.CU and/or use computing units VSYS.CU and/or training computing units TSYS.CU.

In versions of one or more embodiments of the present invention, the provision system BSYS and/or the use system VSYS and/or the training system TSYS can be comprised by a medical apparatus MV, in particular an x-ray apparatus. The x-ray apparatus can in particular be a conventional x-ray system or a CT system or a C-arm system or a mammography system or an angiography system. In particular the x-ray apparatus can comprise at least one x-ray tube and one x-ray detector.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

Where this has not occurred explicitly but is meaningful in the sense of the present invention, individual exemplary embodiments, individual subaspects or features thereof can be combined with one another or exchanged for one another without departing from the framework of the current invention. Advantages of the present invention described with regard to one exemplary embodiment also apply, without this being explicitly stated, where transferrable, to other exemplary embodiments.

What is claimed is:

1. A computer-implemented method for provision of a trigger token, wherein the trigger token correlates to a need for maintenance of a system, the computer-implemented method comprising:
   receiving a logfile of the system, wherein the logfile includes a plurality of event descriptions, and wherein a subset of the plurality of event descriptions is assigned a time stamp;
   receiving a point in time of a technical defect of the system;
   extracting tokens from the subset of the plurality of event descriptions based on a token category, wherein each of the extracted tokens is contained as a character string in the subset of the plurality of event descriptions;
   grouping identical tokens extracted from different event descriptions in the subset of the plurality of event descriptions;
   determining the trigger token from the extracted tokens based on a correlation of time stamps assigned to groups of identical extracted tokens with the point in time of the technical defect of the system, such that the time stamp assigned to the trigger token and the point in time of the technical defect of the system have a positive correlation, the positive correlation being based on a frequency of occurrence of the trigger token with respect to the point in time of the technical defect of the system; and
   provisioning the trigger token.

2. The computer-implemented method as claimed in claim 1, wherein the token category is at least one of the following token categories:
   a sequence of letters,
   a number, or
   an error code.

3. A computer-implemented method of utilizing the trigger token, provided according to the computer-implemented method as claimed in claim 2, for automated maintenance of a system, the computer-implemented method comprising:
   receiving a logfile of the system;
   determining at least one of a first occurrence or a number of incidences of the trigger token in the logfile; and
   initiating the automated maintenance of the system as a function of the at least one of the first occurrence or the number of incidences of the trigger token in the logfile.

4. The computer-implemented method as claimed in claim 1, wherein the extracting of the tokens comprises:
   filtering the subset of the plurality of event descriptions based on a regular expression, wherein
   the regular expression is based on the token category.

5. The computer-implemented method as claimed in claim 1, further comprising:
   receiving time stamps assigned to the trigger token provided from a system;
   receiving a point in time of a technical defect of the system;
   determining a probable point in time of an expected technical defect of the system by application of a trained function to one or more of the time stamps;
   adapting at least one parameter of the trained function based on a comparison between the probable point in time and the point in time of the technical defect of the system; and
   provisioning the trained function.

6. A computer-implemented method of utilizing the trigger token, provided according to the computer-implemented method as claimed in claim 1, for automated maintenance of a system, the computer-implemented method comprising:
   receiving a logfile of the system;
   determining at least one of a first occurrence or a number of incidences of the trigger token in the logfile; and
   initiating the automated maintenance of the system as a function of the at least one of the first occurrence or the number of incidences of the trigger token in the logfile.

7. The computer-implemented method as claimed in claim 6, further comprising:
   automatically performing the automated maintenance.

8. The computer-implemented method as claimed in claim 7, wherein
   the logfile includes multiple occurrences of the trigger token,
   the trigger token is assigned a time stamp for each of the multiple occurrences in the logfile,
   the initiating the automated maintenance of the system is based on a temporal course of the multiple occurrences of the trigger token.

9. The computer-implemented method as claimed in claim 7, wherein
the system includes an x-ray apparatus,
the x-ray apparatus includes an x-ray tube, and
the automatically performing includes automatically adjusting at least one of the x-ray tube or a switchover of an operating mode of a focus of the x-ray tube.

10. The computer-implemented method as claimed in claim 9, wherein
the logfile includes multiple occurrences of the trigger token,
the trigger token is assigned a time stamp for each of the multiple occurrences in the logfile,
the initiating the automated maintenance of the system is based on a temporal course of the multiple occurrences of the trigger token.

11. The computer-implemented method as claimed in claim 6, further comprising:
determining a probable point in time of an expected technical defect of the system as a function of the time stamp assigned to the trigger token at a first occurrence of the trigger token in the logfile, wherein
the initiating of the automated maintenance is based on the time stamp assigned to the trigger token and the probable point in time of the expected technical defect of the system.

12. The computer-implemented method as claimed in claim 6, wherein
the logfile includes multiple occurrences of the trigger token,
the trigger token is assigned a time stamp for each of the multiple occurrences in the logfile, and
the initiating the automated maintenance of the system is based on a temporal course of the multiple occurrences of the trigger token.

13. The computer-implemented method as claimed in claim 12, further comprising:
applying a trained function to the time stamp assigned to the trigger token for determining a probable point in time of an expected technical defect of the system;
provisioning the probable point in time of the expected technical defect of the system; and
wherein the initiating the automated maintenance is based on the probable point in time of the expected technical defect of the system.

14. A provision system for provision of a trigger token, wherein the trigger token correlates with a need for maintenance of a system, the provision system comprising:
an interface configured to
receive a logfile of the provision system, the logfile including a plurality of event descriptions, and a time stamp being assigned to a subset of the plurality of event descriptions,
receive a point in time of a technical defect of the system, and
provision the trigger token; and
processing circuitry configured to
extract tokens from the subset of the plurality of event descriptions based on a token category, wherein each of the extracted tokens is contained as a character string in the subset of the plurality of event descriptions, and;
group identical tokens extracted from different event descriptions in the subset of the plurality of event descriptions; and
determine the trigger token from the extracted tokens based on a correlation between time stamps assigned to the groups of identical tokens and the point in time of the technical defect of the system, such that the time stamp assigned to the trigger token and the point in time of the technical defect of the system have a positive correlation, the positive correlation being based on a frequency of occurrence of the trigger token with respect to the point in time of the technical defect of the system.

15. A medical apparatus comprising the provision system as claimed in claim 14.

16. The medical apparatus of claim 15, wherein the medical apparatus is an x-ray apparatus.

17. A non-transitory computer program product including a computer program, the computer program having program sections that, when executed by a provision system, cause the provision system to carry out the method as claimed in claim 1.

18. A non-transitory computer-readable storage medium storing program sections that, when executed by a provision system, cause the provision system to carry out the method as claimed in claim 1.

* * * * *